3,533,674
HOLOGRAPHIC RECORDING VIA THREE-LEVEL SOLID STATE LASER MATERIAL
Robert E. Brooks, Redondo Beach, Lee O. Heflinger, Torrance, and Ralph F. Wuerker, Palos Verdes, Calif., assignors to TRW Inc., Redondo Beach, Calif., a corporation of Ohio
Filed Mar. 27, 1968, Ser. No. 716,423
Int. Cl. G02b 27/22
U.S. Cl. 350—3.5    4 Claims

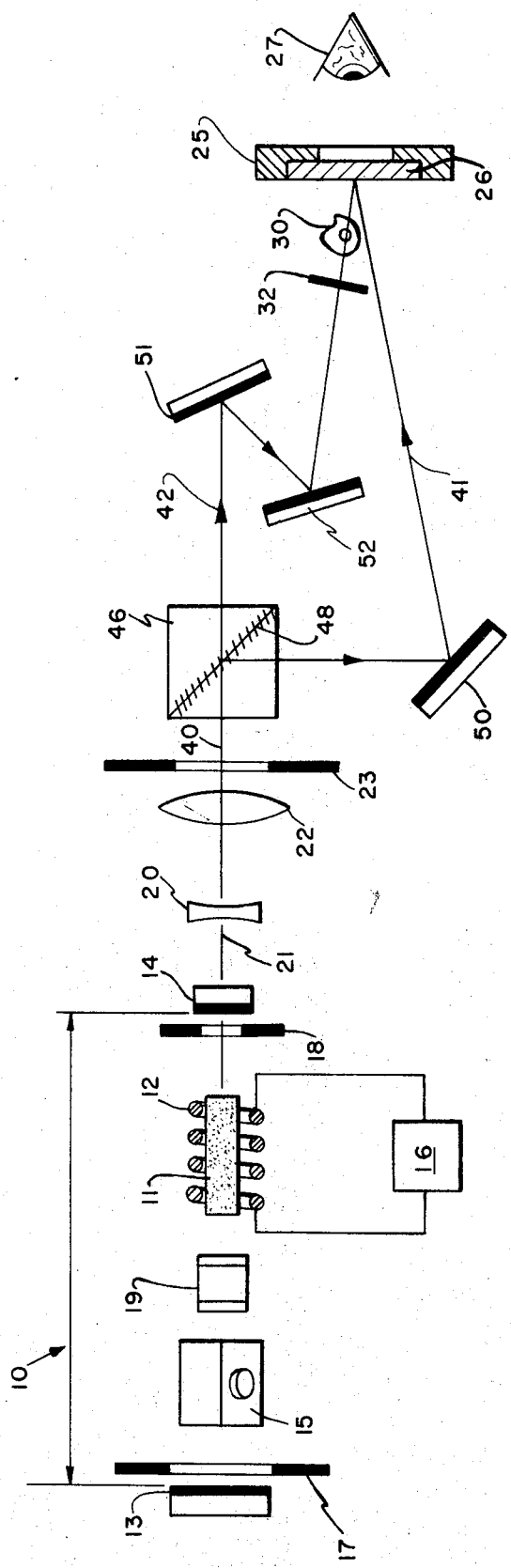
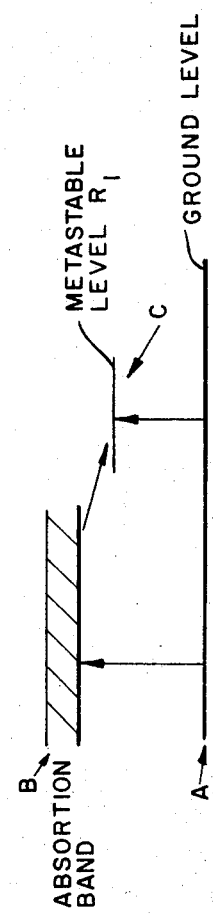
Fig. 1
Fig. 2
Robert E. Brooks
Lee O. Heflinger
Ralph F. Wuerker
INVENTORS

United States Patent Office 3,533,674
Patented Oct. 13, 1970

ABSTRACT OF THE DISCLOSURE

In a holographic apparatus, a solid state three-level laser is used as the source of coherent light. The recording plate which heretofore had been photographic film or plates is replaced with a plate made from the same type of three-level laser material used to make the solid state laser. The laser material plate provides a temporary recording of the hologram, the retention time of which is determined by the fluorescent lifetime of the material itself.

BACKGROUND OF THE INVENTION

This invention relates generally to the field of holography and, more particularly, to a novel means for recording holograms.

The art of holography is based upon the recording on film of a diffraction pattern which is created by the interference between light scattered from an object or scene that has been illuminated and directly impingent light from the same light source. The exposed photographic film is then developed and upon illumination with light from either the same or a similar coherent light generating source, positioned in the same geometric relation with respect to the developed film, produces a diffracted beam which is a reconstruction of the original pattern scattered from the scene at the time of the exposure. This particular property results in a virtual three-dimensional image whose perspective changes with viewing angle. Generally, the plate on which the hologram is produced is a high resolution photographic plate which is exposed to the reference and scene beam and subsequently developed to give a permanent holographic record. Because of the time and expense involved with developing each photographic plate, it would be highly desirable to have a recording medium which would temporarily retain the holographic image and which would be ready to receive and record an entirely new image as soon as the prior recorded image is dissolved, and even further, which was capable of performing these functions without the necessity of going through a chemical developing process.

SUMMARY OF THE INVENTION

Briefly, in accordance with one embodiment of this invention, for recording a hologram of an object, coherent radiation from a solid state three-level laser source is scattered by the object. A plate made of the same three-level material as the solid state laser source is exposed to a reference beam of coherent radiation from the source and a beam of scattered coherent radiation that is scattered from the object. Upon exposure to these two beams, the solid state plate absorbs light energy in those regions of constructive interference between the two beams while in the regions of destructive interference, the plate is relatively unaffected. In the regions that absorb the light energy, there occurs a bleaching of the plate material. This bleaching is retained for a period of time which is equal to the fluoroescent lifetime of the material. For the specific case of ruby, this lifetime is approximately 3 milliseconds. During this time, a permanent recording of the hologram may be made if desired by copying the pattern retained in the plate using standard photographic techniques. It is also possible to use other three-level solid state lasers and their corresponding laser plates which are operated in the infrared region to obtain holograms in applications where non-visibility (secrecy) is a requirement and where photographic media are not sensitive.

Holographic arrangements using three-level laser recording media have the further advantage in that unlike photographic plates, the medium is thick and can, as a result, store more information. Unlike laser materials themselves, the medium need not be as optically homogeneous, since the holography technique is self-correcting for errors in phase. This also allows the use of higher concentrations of the optically active dopant to be employed in the laser material up to the point where the fluorescent line width is modified by changes in the internal crystal field.

Accordingly, it is a primary object of the present invention to provide a new medium for recording holograms.

It is a further object of the present invention to provide a new medium which temporarily records a holographic image.

It is a further object of the present invention to provide a hologram recording medium which requires no chemical development.

The foregoing and other objects and features of the present invention will become more apparent and better understood when taken in conjunction with the following description and the accompanying drawings, throughout which like characters indicate like parts, and which drawings form a part of this application.

BRIEF DESCRIPTION OF THE DRAWINGS

FIG. 1 is a schematic diagram illustrating the preferred embodiment of the present invention; and FIG. 2 is an energy level diagram indicating the transitions which occur in the laser material plate when it is illuminated with laser light.

DESCRIPTION OF THE PREFERRED EMBODIMENT

Referring to FIG. 1, the solid state laser coherent light source 10 is shown comprised of an elongated rod of solid state lasing material 11, and two external reflectors 13 and 14, the ends of which are coated with dielectric reflective film. The reflective ends form a resonant optical cavity with the lasing material. The dielectric reflector 14 is partially transmissive to allow a beam of coherent energy 21 to be transmitted to the lens 20. All beams in the following description will be illustrated as a single central ray for purposes of simplicity. A laser pump supply 16 provides the necessary pumping power to a pumping light source 12 which may be a xenon gas filled helically shaped lamp wound around the lasing rod 11. The rod 11 in the embodiment shown is made of ruby, but it may be made from any other solid state three-level lasing material without departing from the scope of the invention. Also located within the optical cavity there may, for example, be provided a polarizer 19, which may be a Glan type polarizer, and a switching device 15, such as a Kerr cell or similar device for increasing the gain of the optical cavity in ways well known to those persons skilled in the art, such that a pulse of coherent light is generated. However, for purposes of the present invention there is no necessity to utilize such a Q-switched laser. The lens 20 diverges the beam from the laser 10. Lens 22 is a collimating lens positioned to receive the coherent beam from lens 20; lens 22 collimates the beam from the laser source into a relatively wide parallel beam 40. The beam 40 is next split into a first or scene beam 42 and a second or reference beam 41 by means of a transparent cubical beam splitter 46. The beam splitter 46 has a beam splitting surface 48, which is partially silvered so that beam 40 is split to form the beam 42 which passes through the surface 48, and the beam 41 which is reflected from the surface 48. Mirrors 50, 51 and 52 serve to recombine the two split beams 41 and 42 at the plate 26. The plate 26 is made from a material which is identical to the lasing material 11 used in the coherent light source 10. The plate of material is mounted in a holder 25 and positioned along the intersection plane of the beams 41 and 42. An eye 27 symbolically portrays a means for observing the hologram which is generated in the laser medium of plate 26 when the laser source 10 is activated. A scene 30, to be recorded, is placed in the scene beam 42, as shown. Diffuser screen 32 of ground glass, or the like, is positioned in the scene beam 42, as shown. The mirrors 50, 51 and 52 are arranged and positioned such that the two beams 41 and 42 undergo the same number of reflections along substantially equidistant optical paths in traveling from the surface 48 to the plate 26. This provides a superimposition of the two beams 41 and 42 at the plate both in space and time. The aperture masks 17, 18 and 20 mask out unwanted radiations that tend to degrade the quality of the beam 40. These masks are positioned as shown and have an aperture opening, generally circular in shape, the width or diameter of which determines the width or diameter of the output beam 40. The diffusing screen 32 may be left out of the scene beam 42. Beam 42 then illuminates the scene 30 and the plate material 26, with the result that each virtual image is located behind the plate material, exactly as in the original scene. Although lacking in perspective and in overall aesthetics, such a hologram has the advantage that it is not limited in depth of field. With the diffusing screen 32 in place, illumination of the scene 30 over wider angles can be obtained, resulting in a hologram which provides perspective as well as the ability to "see around" the reconstructed virtual image.

As an aid in the understanding of the operation of this particular device, it is necessary to explain the manner in which the energy level of the lasing material is raised by optical pumping. For purposes of explanation, the solid state material used will be ruby. Lasing ruby is comprised of aluminum oxide in which a few of the aluminum atoms have been replaced by chromium atoms. One noticeable effect that occurs with an increase in the number of chromium atoms is a deepening of the color of the ruby. When such a ruby material is subjected to optical pumping by external green light at a wave length of, say, 5,500 angstrom units, the energy level of the chromium atoms will be raised by the absorption of the pumping light.

FIG. 2 shows that the ground level of a chromium ion in sapphire is represented by the line A. Upon pumping of the ruby by green light, the light absorbed by the chromium ion raises the energy of the ion to the absorption band level indicated by B. The atom then experiences a radiationless transition to the lower metastable $R_1$ level indicated by C in the diagram. The transition time from the absorption band to the metastable level is very short, being $\simeq 10^{-8}$ seconds. The difference in energy between the absorption band and the metastable level is given up to the sapphire lattice. The metastable level has a long lifetime and is the level which can be stimulated (or "lased") whenever the density of excited atoms exceeds that of unexcited atoms. It is only through the absorption band (B in FIG. 2) that the number of excited states can exceed the number of unexcited atoms, and a condition of a population inversion is realized. This is necessary for the construction of lasers. Materials which have a ground state, an upper absorption band, and a lower metastable level are classified or referred to as three-level laser materials.

The metastable level, besides being populated through absorption of radiation at wavelength of the pumping band can also be populated by absorption of radiation of wavelength equal to that of the metastable level. However, in this case, an inversion cannot be achieved since when the population density equalizes, the medium becomes transparent to radiation of wavelength equal to that of the metastable transition. It is this feature which is of interest to the present invention.

As can be seen from the above discussion, the solid state ruby material is a three-level material which absorbs light of a wavelength equal to the wavelength of the fluorescent transition, that the absorptivity of the medium can be changed by illuminating the medium with its own laser light (wavelength), and that the change in the transmission of the medium will persist for times equal to the fluorescent lifetime of the particular excited quantum state. As a result of these inherent properties, slabs of laser material may be used in those cases where storage of information for brief periods of time ranging in the millisecond range are required.

The optical transmission of any three-level laser medium is given by the following well-known equations, namely:

$$I = I_0 \exp(N_2 - N_1)\sigma_s l \qquad (1)$$

where:

$I_0$ is the incident flux of wavelength $\lambda_s$ (watts/meter$^2$).
I is the transmitted flux.
exp is the base of natural system of logarithms.
$N_2$ is the number of atoms per unit volume excited to the upper fluorescent quantum state (excited atoms/meter$^3$).
$N_1$ is the density or number of unexcited atoms still in the ground state (unexcited atoms/meter$^3$).
$\sigma_s$ is the cross section (meter$^2$) for the absorption and reradiation of light at the fluorescent wavelength $\lambda_s$.
$l$ is the physical thickness of material (cm.).

In addition, one has the auxiliary condition that the three-level laser medium, the total number of excitable atoms per unit volume of material (denoted by $N_0$ atoms/meter$^3$) is equal to the sum at any time of the number of atoms in the upper and lower state, namely:

$$N_0 = N_1 + N_2 \qquad (2)$$

Reference to Equation 1 shows the three main features of the three-level laser material, namely, that the absorption is greatest when the medium is unexcited and all of the atoms are in the ground state, that is, $N_1 = N_0$, and the product $N_0 \cdot \sigma_s = \alpha_0$, the linear absorption coefficient of the medium. That the medium becomes perfectly transparent to its own fluorescent radiation when the number of excited atoms per unit volume equals the number of unexcited atoms, i.e., $N_1 = N_2$; and that the transmitted intensity can be greater than the incident intensity when the number of excited states exceeds the number of unexcited states. The first two features are the ones that are important to the present invention since they show that the laser medium can be bleached by illuminating it with its own laser radiations. Inversion (lasing) cannot be achieved due to the fact that after the population densities are equalized, the medium is by definition transparent and cannot absorb any more of its own fluorescent radiation.

In applying this invention to the field of holography, the photographic plate is replaced with a piece or slab of ruby, positioned at the intersection of the scene and reference beams, and a ruby laser is used as the primary source of illumination. Thus, in the regions of constructive interference between the scene and reference beams, the ruby slab will be bleached, while in the regions of destructive interference, the medium will be unaffected. The entire slab will then retain a portion of the original stationary three-dimensional interference pattern between the scene and reference beams. The retention time will be equal to the fluorescent lifetime of the state of the material used.

Illumination of the slab 26 by a beam which resembles the original scene beam will cause light to be diffracted from the slab in a manner which recreates the light wave pattern of the original scene. The particular case of a ruby material has been discussed in this application since it is one of the most popular three-level solid state laser materials. Other materials, including ytterbium in silicate host which lases in the infrared at 1.015 microns, divalent thallium in calcium fluoride which lases at 1.1153 microns, divalent samarium in strontium fluoride, and others, may be used with varying degrees of success. Included in the list of materials in the most general sense, are photochromic materials, both solids and liquids, and fluorescent materials.

Four-level laser materials are not easily adapted to this particular recording function due to the fact that the laser transition terminates on a level which is above the ground state. As a result, four-level materials are transparent to their own radiation. They can, however, be made absorptive by pre-exposing them under a light from a xenon lamp. The lifetime of the transition from the terminal level to the ground level is generally fast and the absorptivity shortlived.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A holographic apparatus for recording a hologram comprising:
   (a) a laser source for generating a beam of coherent light;
   (b) a beam splitter disposed in the path of said beam of light to provide a subject beam and a reference beam;
   (c) optical means disposed respectively in the path of said subject beam and of said reference beam for directing each of said beams toward a predetermined plane; and
   (d) a laserable material disposed in said predetermined plane for temporarily recording a hologram, said laserable material having a fluorescent transition band which, when illuminated by said beam of coherent light, will absorb a fraction of said coherent light which decreases with increasing intensity of said coherent light, said hologram existing for a period of time on the order of the natural transition time of said fluorescent band and being capable of being reproduced by illumination with said reference beam.

2. A holographic apparatus as defined in claim 1 wherein said laserable material is a solid state material.

3. A holographic apparatus as defined in claim 1 wherein said laserable material is a three-level solid state material.

4. A holographic apparatus as defined in claim 1 wherein said laser includes a laserable material which is the same as said laserable recording material, whereby said recording material absorbs the radiation radiated by said laser source by said fluorescent transition.

References Cited

UNITED STATES PATENTS

| 3,123,711 | 3/1964 | Fajans | 250—71 |
| 3,281,713 | 10/1966 | Soules | 331—94.5 |
| 3,411,106 | 11/1968 | Friedl | 331—94.5 |

OTHER REFERENCES

Megla, "Optical Properties and Applications of Photochromic Glass," Applied Optics, vol. 5, No. 6, (June 1966).

DAVID SCHONBERG, Primary Examiner

R. L. SHERMAN, Assistant Examiner

U.S. Cl. X.R.

250—71